M. B. KIRKER.
HYDRAULIC VALVE.
No. 10,943. Reissued July 10, 1888.
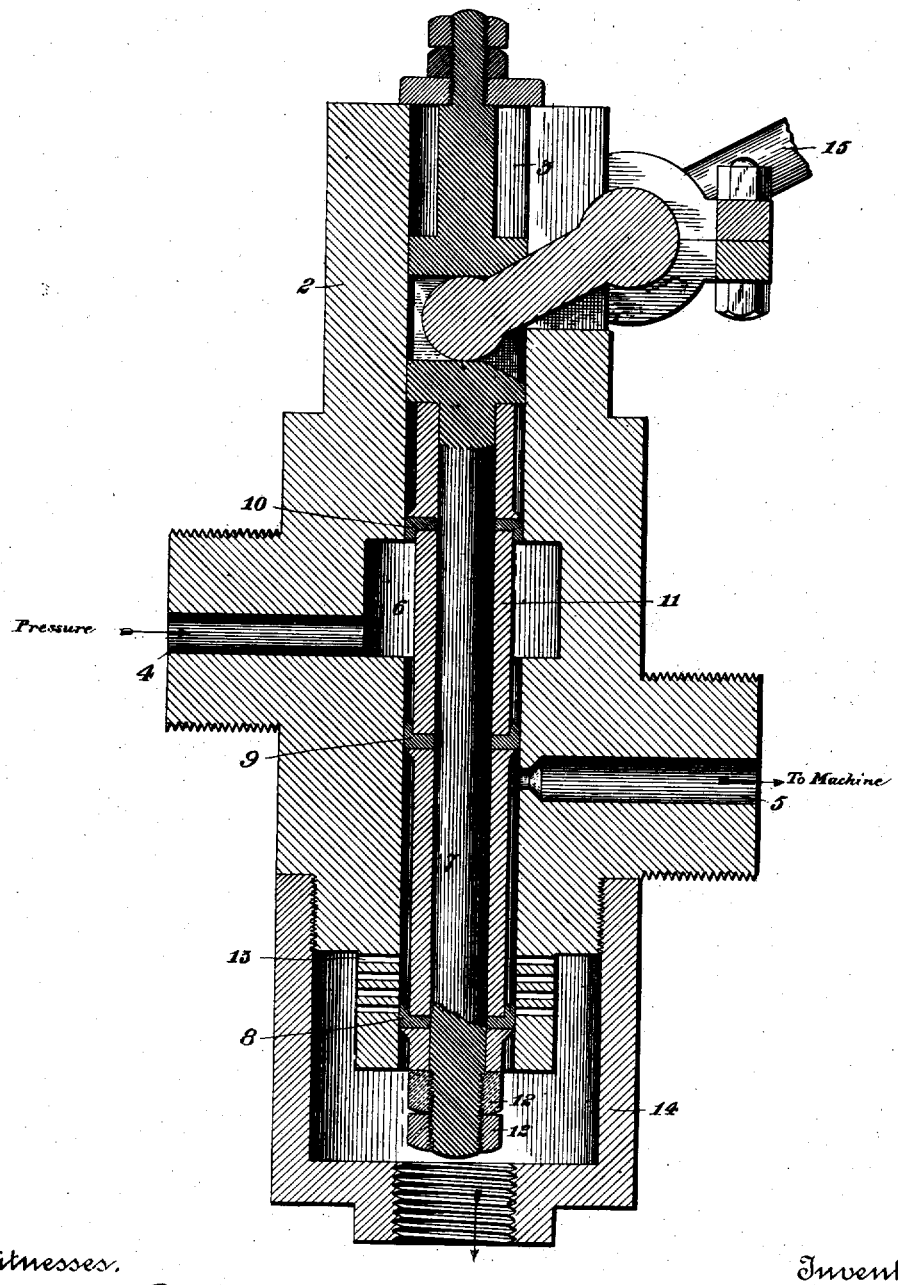
Witnesses.
W. B. Corwin.
H. L. Gill.
Inventor.
Milton B. Kirker.
by W. Dawell & Sons.
his Attorneys.
THE NORRIS PETERS CO., PHOTO-LITHO., WASHINGTON, D. C.

UNITED STATES PATENT OFFICE.

MILTON B. KIRKER, OF McKEE'S ROCKS, PENNSYLVANIA.

HYDRAULIC VALVE.

SPECIFICATION forming part of Reissued Letters Patent No. 10,943, dated July 10, 1888.

Original No. 382,003, dated May 1, 1888. Application for reissue filed May 26, 1888. Serial No. 275,261.

*To all whom it may concern:*

Be it known that I, MILTON B. KIRKER, of McKee's Rocks, in the county of Allegheny and State of Pennsylvania, have invented a new and useful Improvement in Hydraulic Valves; and I do hereby declare the following to be a full, clear, and exact description thereof.

My invention relates to an improvement in valves which are used in connection with hydraulic machinery—such as the machinery used in rolling-mills and in Bessemer-converter plants, &c.—and for other similar purposes. In the construction of valves of this kind the enormous pressure of the water which passes through them and the other conditions of the use to which they are subjected make it necessary that they shall be simple in their construction, not liable to get out of order, and that they shall be balanced in their action, so that it shall not require excessive force to operate them. It has been the object of inventors of valves of this class to obtain these results; but prior valves, owing to defects in their construction, have been only imperfectly successful. The reasons for this are either that the valve is not well balanced and that it is difficult to move it, or that it is liable to leak, or that the great pressure of the water acts upon the packing of the valve, so as to rapidly cut it, and thus to impair the usefulness and effective life of the valve. This last-mentioned difficulty is especially incident to valves heretofore used, because they have generally been constructed so that the packing on the valve-rod shall be obliged to cross over the ports through which the water enters the valve and through which the water finds its adit to the hydraulic machine. I have therefore constructed my valve with a view to obviate this difficulty, so that in action the packing on the stem shall not cross the ports when subjected to pressure. In this way I make the valve much more easy to operate, and enable it to be used for a much longer time without repair. My valve also possesses certain features of advantage by reason of its simplicity of construction and ease of operation, which I shall hereinafter indicate.

The accompanying drawing shows in vertical central section a hydraulic valve constructed according to the principles of my invention, and I shall now describe its construction with reference thereto.

The valve consists of a cylinder, 2, having a bore, 3, of any desired diameter extending from end to end.

4 is a port in the side of the valve communicating with the hydraulic-pressure apparatus, and 5 is a port communicating with the machinery which is to be operated hydraulically. The port 4 opens into a cylindrical chamber, 6, which is constituted by an enlargement of the bore 3 of the valve-cylinder 2.

Within the bore of the valve-cylinder is a valve-stem, 7, and on this stem 7 are placed leather, rubber, or any suitable packing-rings, 8, 9, and 10, which are held on the rod between encircling cylindrical sleeves 11. These sleeves are confined in place by means of nuts 12 at the lower end of the valve-stem. The upper disk, 10, of these packing-disks is above the chamber 6 when the valve-stem is in its lowest position, as shown in the drawing. The packing-disk 9 is then between the chamber 6 and the port 5, and the last packing-disk 8 is then below the exhaust-ports 13, which are formed through the side of the cylinder 2, and which communicate with an exterior exhaust-chamber, 14. This exhaust-chamber 14 is constituted by a hollow cup which is screwed on a contracted portion at the lower end of the cylinder 2, and which is provided at its bottom with a threaded opening, into which the usual exhaust-pipe of the valve is screwed. The valve-stem 7 is operated by means of a lever, 15, connected with the stem in the usual way.

The operation of the valve is as follows: As shown in the drawing, the valve-stem 7 is at its lowest position, and the pressure is cut off from the machine and communication is established between the machine and the exhaust through the ports 5 and 13. In order to close the exhaust-port and to allow the water-pressure to enter the machine, the valve-stem 7 is raised until the packing-disk 9 enters the chamber 6. This also raises the packing-disk 8 above the level of the exhaust-ports 13, thus cutting off communication with these ports and opening communication between the pressure-port 4 and the machine-port 5. The water then flows through the port 4 and chamber 6 around the sleeve 11 and through the port 5 to the machine. When the valve-stem was in its original position, as shown in the drawing, the stem was balanced by reason of the equal opposite pressure of the water in the chamber 6 upon the packing 10 on the upper side and the packing 9 on the lower side. The raising of the valve-stem so as to bring the packing 9 into the chamber 6 does not disturb this equilibrium of pressure, because the water then still bears upward against the packing 10 and downward against the packing 8. The packing 8 therefore takes the place of the packing 9 in preserving the balance of the valve, the packing 9 operating in this regard when the valve is closed and the packing 8 operating when the valve is open. In order to close the valve the lever 15 is moved so as to force down the stem 7. This carries the packing 9 out of the chamber 6 into the cylindrical bore 3, surrounding the sleeve 11, and as the packing 9 is cup-shaped in an upward direction its backward movement past the extremity of the chamber 6 has no injurious effect in wearing the packing. The bringing of this packing 9 into its original position between the chamber 6 and the port 5 acts to regulate the water-connection between the chamber 6 and this port and opens communication between this port and the exhaust. In this motion of the valve the packing-disk 8 of course crosses the exhaust-ports 13; but as it is then moving backwardly and as its curvature is upward, it does not wear the packing, as already explained with reference to the packing 9. The upward motion of the packing 8 across the exhaust-ports 13 does not have any injurious effect, because when the valve-stem is moved in this direction to open the valve the pressure of the water is altogether cut off from this packing by means of the upper packing, 9, and the pressure does not have access thereto until the packing 8 has crossed the uppermost exhaust-port. This result is effected by making the length of motion of the packing 9 from its lowest position into the chamber 6 a little longer than the motion of the packing 8 across the exhaust-ports 13. By reason of this construction it is possible, by raising the stem 7 so that the packing 9 shall be just below the edge of the chamber 6 and the packing 8 shall be just above the highest exhaust-port 13, to cut off communication of the machine, both with the pressure-port 4 and the exhaust-port, so that the hydrostatic pressure in the machine, whatever it may be, may be kept constant.

I have shown and described the construction of the valve which I deem to be well fitted for the purpose for which it is intended, the same being a construction which I have already put in use and the utility of which I have conclusively demonstrated. I do not, however, desire to limit myself to the precise form of this valve which I have shown and described, since the proportions and the relative arrangement of the parts may be somewhat altered. For example, the valve may be horizontal instead of vertical, the port 5 and the exhaust may be on the upper side of the port 4 instead of on the lower side, and the exhaust may be on the side of the valve instead of at the end. These and other modifications will suggest themselves to the skilled mechanic, and do not of course involve a departure from the spirit of my invention.

The advantages of my invention will be apparent to those skilled in the art. The valve is very simple. It is cheap in its construction, and by reason of the small number of its ports and their relative relation to each other it is stronger and more effective than any other valves of the class which I have known.

The advantages of my invention are due, principally, to the presence of the chamber 6, in which the packing 9 moves, in order to open communication between the pressure-port and the machine-port. This distinguishes my valve from others in which the packing crosses the pressure-port 4 in order to open the valve. The crossing of the port cuts and wears the valve, as I have already explained, and the use of the chamber to a large degree prevents this cutting and wear. In valves of this prior construction the motion of the packing-rings backward across the port may have no bad effect; but in their motion in the other direction, in which the forward edge of the packing comes in contact with the side of the port, the cutting of the packing is very rapid and soon spoils the efficiency of the valve.

I claim—

1. In a hydraulic valve, the combination, with the valve-casing having an enlarged chamber, 6, a pressure-port communicating therewith, a machine-port, 5, and a cylindrical bore between the port 5 and the chamber 6, of a valve-stem having a packing-disk which encircles the valve-stem and closes the space between the stem and the side of the said cylindrical bore, said packing-disk working with the valve-stem between the port 5 and the chamber 6 and into the chamber 6, substantially as and for the purpose set forth.

2. In a hydraulic valve, the combination, with the valve casing having an enlarged chamber, 6, a pressure-port communicating therewith, a machine-port, 5, and a cylindrical bore between the port 5 and the chamber 6, of a valve-stem having a packing-disk which encircles the valve-stem and closes the space between the stem and the side of the said cylindrical bore, said packing-disk working with the valve-stem between the port 5 and the chamber 6 and into the chamber 6, said disk being cup-shaped and the concavity being on the side next the chamber, substantially as and for the purpose set forth.

3. In a hydraulic valve, the combination, with the valve-casing having a pressure-port, a machine-port, and an exhaust-port, of a valve-stem working within the casing and having a packing-disk which moves between the pressure-port and the machine-port, and a second packing-disk which moves over the exhaust-port, said disk being concave, the concavity being on that side of the disk which is foremost in the motion of the valve over the port when the disk is not under pressure, substantially as and for the purpose set forth.

In testimony whereof I have hereunto set my hand this 14th day of May, 1888.

MILTON B. KIRKER.

Witnesses:

W. B. CORWIN,

H. L. GILL.